US010387067B2

(12) United States Patent
Wozniak et al.

(10) Patent No.: US 10,387,067 B2
(45) Date of Patent: Aug. 20, 2019

(54) OPTIMIZING DATA STORAGE IN A DISPERSED STORAGE NETWORK

(71) Applicant: International Business Machines Corporation, Armonk, NY (US)

(72) Inventors: Ethan S. Wozniak, Park Ridge, IL (US); Andrew D. Baptist, Mt. Pleasant, WI (US); Greg R. Dhuse, Chicago, IL (US); Ilya Volvovski, Chicago, IL (US); Jason K. Resch, Chicago, IL (US); Ravi V. Khadiwala, Bartlett, IL (US); Wesley B. Leggette, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 0 days.

(21) Appl. No.: 15/841,990

(22) Filed: Dec. 14, 2017

(65) Prior Publication Data
US 2018/0107422 A1 Apr. 19, 2018

Related U.S. Application Data

(63) Continuation-in-part of application No. 15/818,633, filed on Nov. 20, 2017, which is a
(Continued)

(51) Int. Cl.
*G06F 11/10* (2006.01)
*G06F 17/30* (2006.01)
(Continued)

(52) U.S. Cl.
CPC ............ *G06F 3/0644* (2013.01); *G06F 3/064* (2013.01); *G06F 3/067* (2013.01); *G06F 3/0619* (2013.01);
(Continued)

(58) Field of Classification Search
CPC ...... G06F 3/0644; G06F 3/0619; G06F 3/064; G06F 3/067; G06F 11/1092;
(Continued)

(56) References Cited

U.S. PATENT DOCUMENTS 4,092,732 A 5/1978 Ouchi
5,454,101 A 9/1995 Mackay et al.
(Continued)

OTHER PUBLICATIONS

Shamir; How to Share a Secret; Communications of the ACM; vol. 22, No. 11; Nov. 1979; pp. 612-613.
(Continued)

*Primary Examiner* — Phung M Chung
(74) *Attorney, Agent, or Firm* — Garlick & Markison; Timothy W. Markison; Bruce E. Stuckman

(57) ABSTRACT

A method for execution by a computing device includes dispersed storage error encoding a data segment to produce a set of encoded data slices. Dispersed storage network (DSN) configuration information is obtained and a write threshold number of encoded data slices is mapped to storage units to produce a slice storage mapping to facilitate storage of the encoded data slices. Unavailability of at least one encoded data slice is detected, and updated DSN configuration information is obtained. An updated slice storage mapping is produced and storage of an updated write threshold number of encoded data slices is facilitated accordingly. Availability of greater than the write threshold number of encoded data slices is detected and further updated DSN configuration information is obtained. A further updated slice storage mapping is produced and storage of a further updated write threshold number of encoded data slices is facilitated accordingly.

20 Claims, 8 Drawing Sheets

Related U.S. Application Data continuation-in-part of application No. 14/984,024, filed on Dec. 30, 2015, now Pat. No. 10,078,472.

(60) Provisional application No. 62/121,736, filed on Feb. 27, 2015.

(51) Int. Cl.
    *G06F 17/00*    (2019.01)
    *G06F 11/07*    (2006.01)
    *G06F 12/16*    (2006.01)
    *G06F 13/00*    (2006.01)
    *G06F 3/06*     (2006.01)

(52) U.S. Cl.
    CPC ...... *G06F 11/1076* (2013.01); *G06F 11/1092* (2013.01)

(58) Field of Classification Search
    CPC ........... G06F 11/1088; G06F 17/30377; G06F 11/10; H04L 67/1097; H03M 13/373
    See application file for complete search history.

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Raiford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 9,110,833 B2 * | 8/2015 | Gladwin ............. G06F 12/1458 |
| 9,727,275 B2 * | 8/2017 | Kazi ................... G06F 11/1092 |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0229069 A1 | 10/2005 | Hassner et al. |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2014/0331086 A1 | 11/2014 | Resch |
| 2017/0147428 A1 | 5/2017 | Volvovski et al. |
| 2017/0300374 A1 | 10/2017 | Gladwin et al. |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

(56) References Cited

OTHER PUBLICATIONS

Sermersheim; Lightweight Directory Access Protocol (LDAP): The Protocol; IETF Network Working Group; RFC 1511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

\* cited by examiner

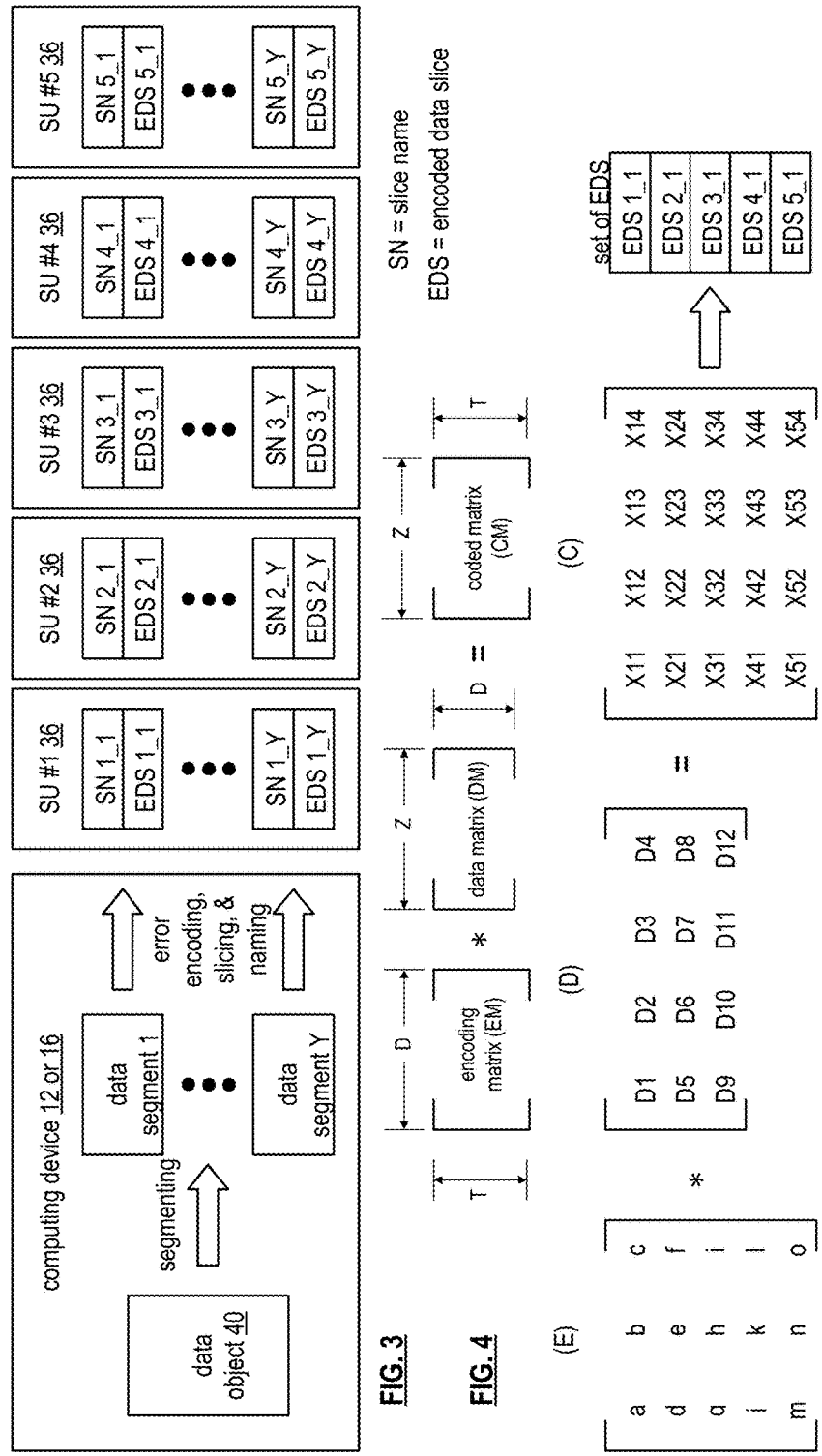

OPTIMIZING DATA STORAGE IN A DISPERSED STORAGE NETWORK

CROSS-REFERENCE TO RELATED APPLICATIONS

The present U.S. Utility Patent Application claims priority pursuant to 35 U.S.C. § 120as a continuation-in-part of U.S. Utility Application Ser. No. 15/818,633, entitled "UTILIZING MULTIPLE STORAGE POOLS IN A DISPERSED STORAGE NETWORK", filed Nov. 20, 2017, which is a continuation-in-part of U.S. Utility Patent Ser. No. 10,078,472, entitled "REBUILDING ENCODED DATA SLICES IN A DISPERSED STORAGE NETWORK", filed Dec. 30, 2015 and issued Sep. 18, 2018, which claims priority pursuant to 35 U.S.C. § 119(e) to U.S. Provisional Application No. 62/121,736, entitled "TRANSITIONING A STATE OF A DISPERSED STORAGE NETWORK", filed Feb. 27, 2015, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
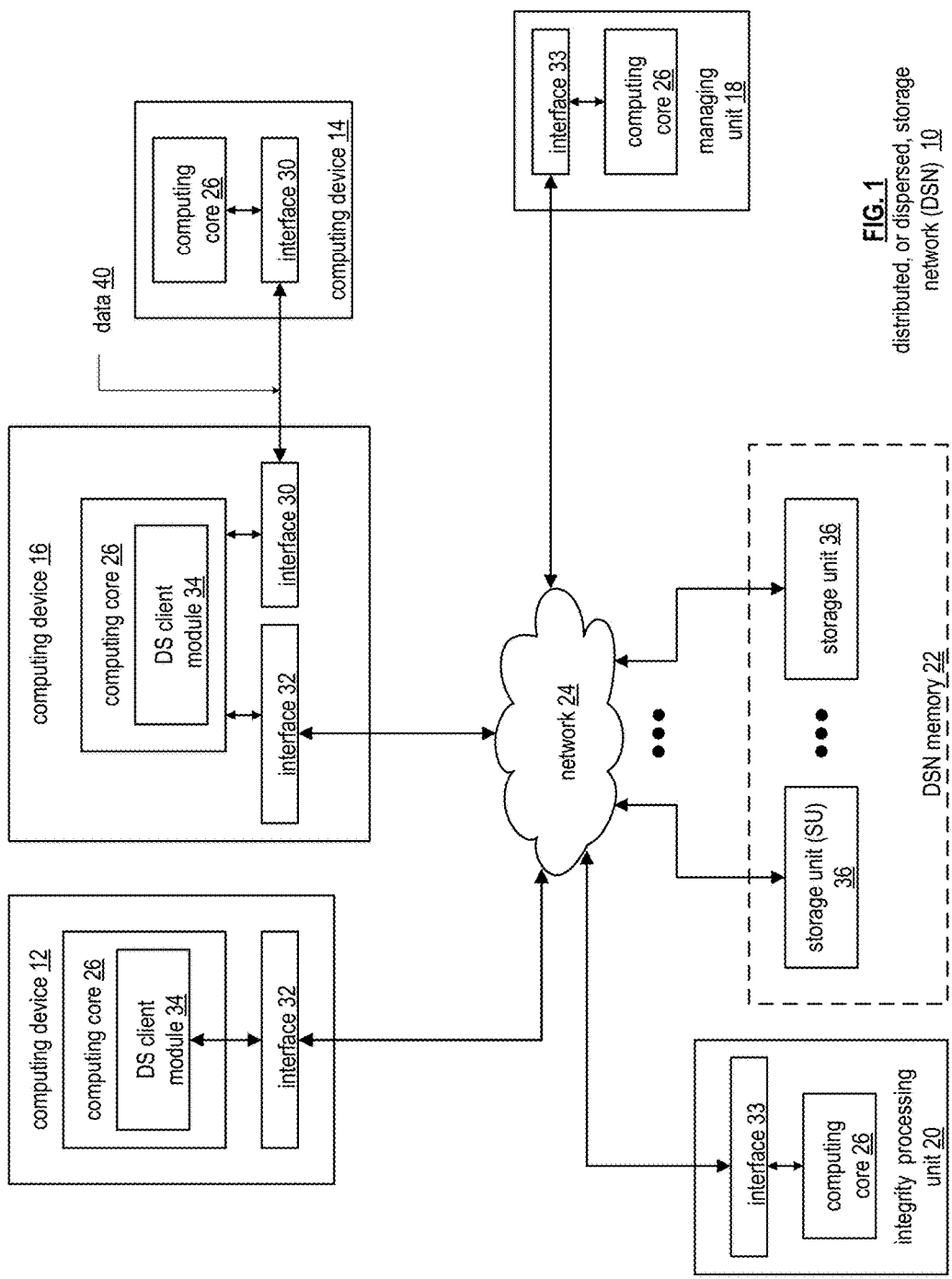
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public interne systems; and/or one or more local area networks (LAN) and/or wide area networks (WAN).

Figure 2:
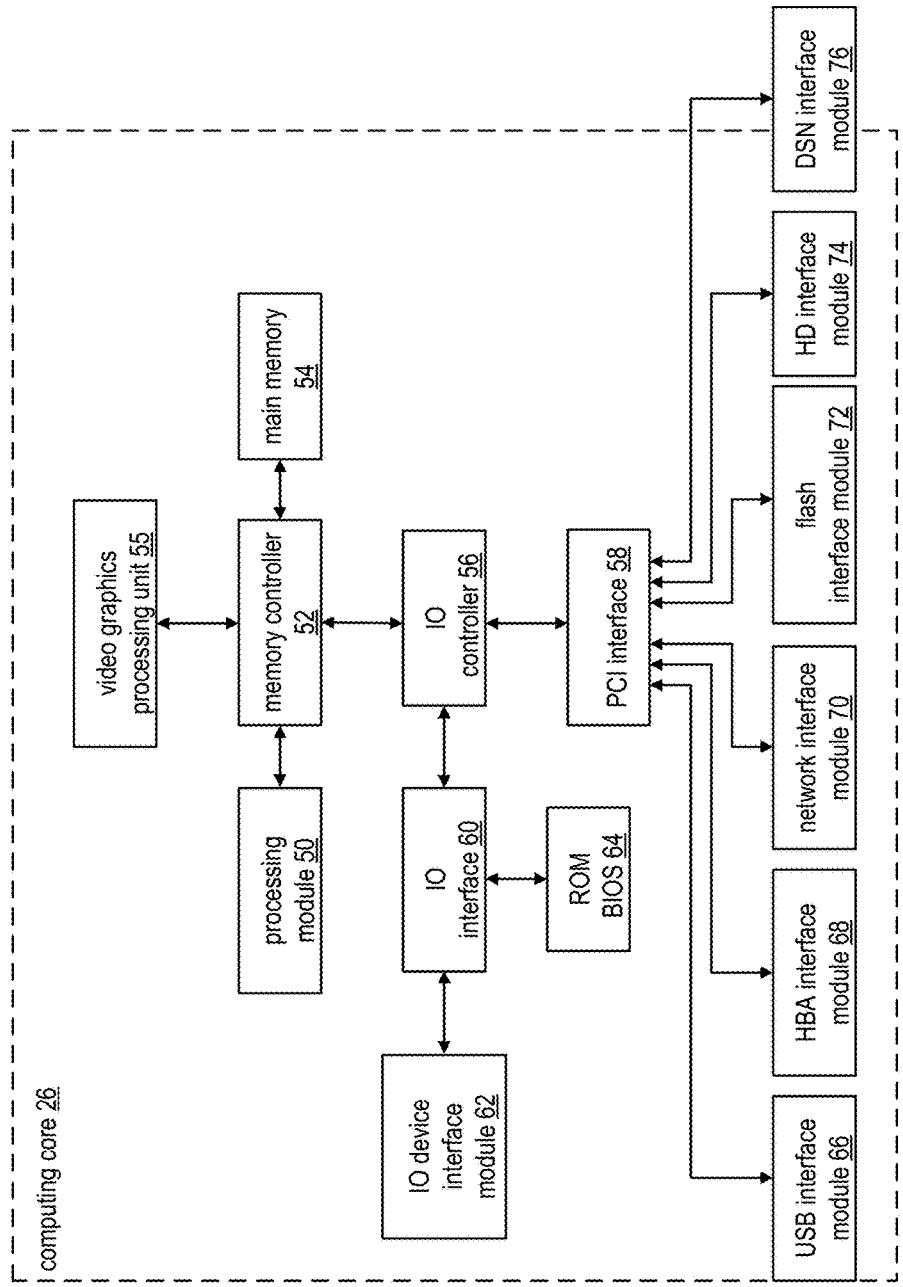
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a dispersed storage and task (DST) execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each managing unit 18 and the integrity processing unit 20 may be separate computing devices, may be a common computing device, and/or may be integrated into one or more of the computing devices 12-16 and/or into one or more of the storage units 36. In various embodiments, computing devices 12-16 can include user devices and/or can be utilized by a requesting entity generating access requests, which can include requests to read or write data to storage units in the DSN.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
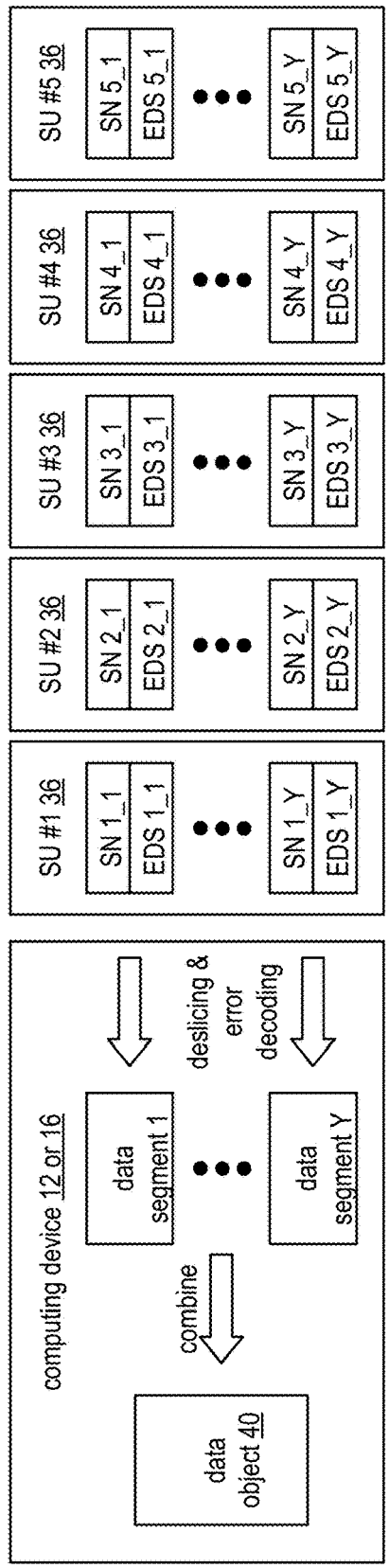
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
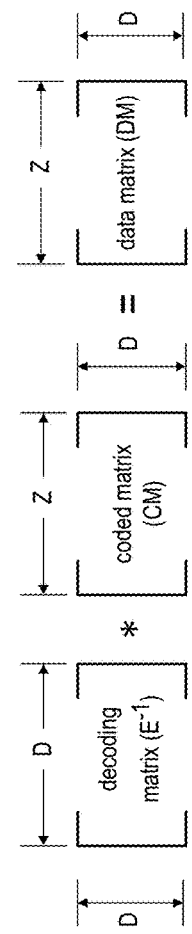
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9A:
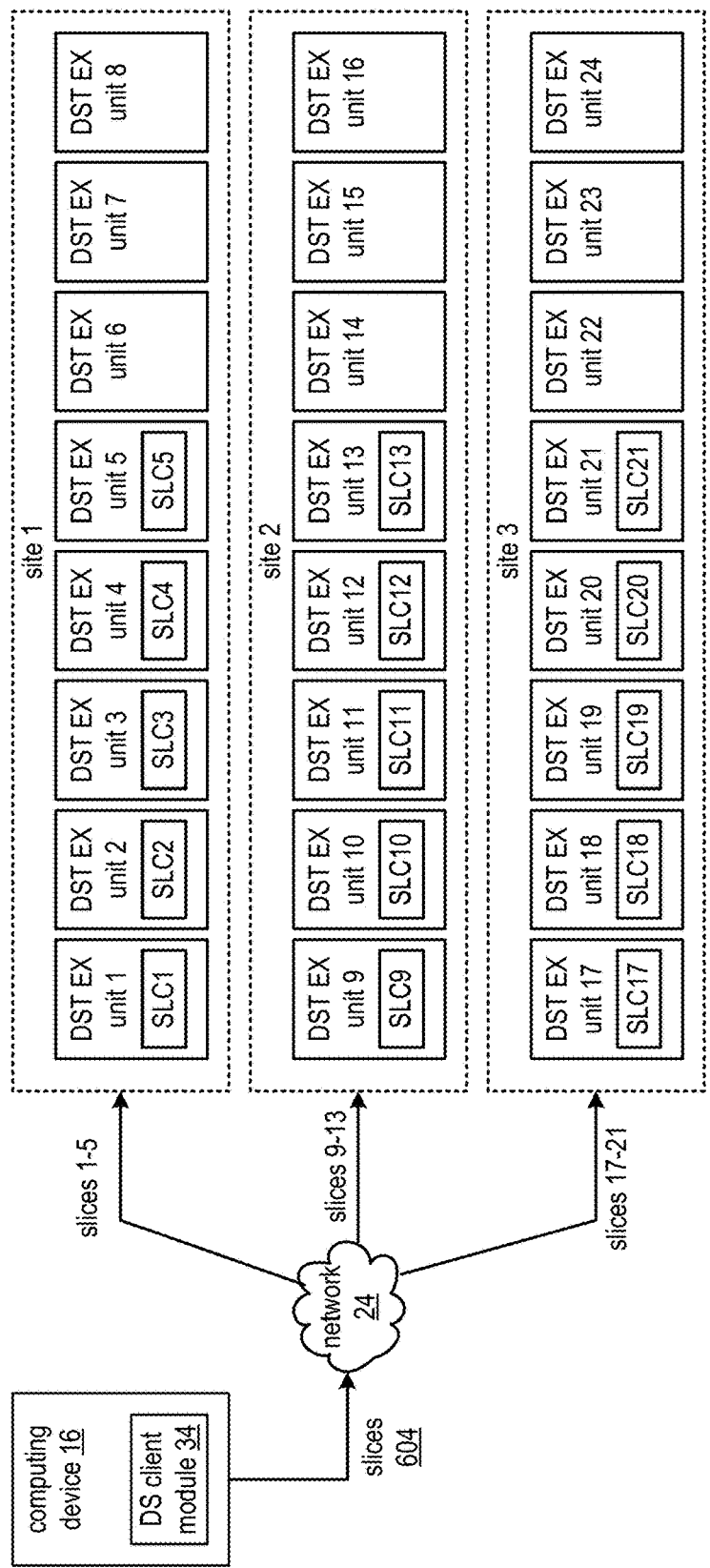
FIG. 9A is a schematic block diagram of an embodiment of a dispersed or distributed storage network (DSN) in accordance with the present invention.
Figure 9B:
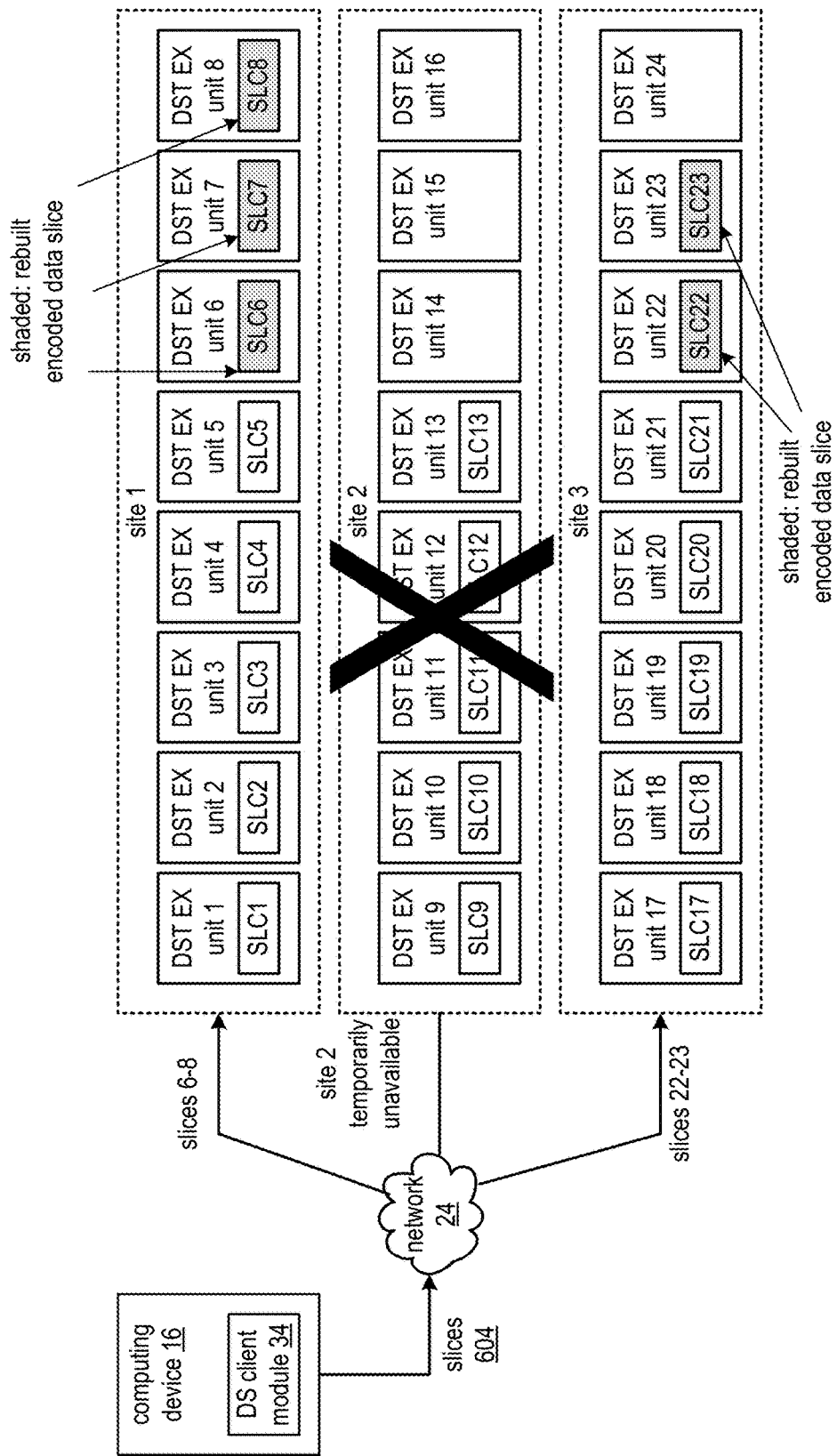
FIG. 9B is a schematic block diagram of an embodiment of a dispersed or distributed storage network (DSN) in accordance with the present invention.
Figure 9C:
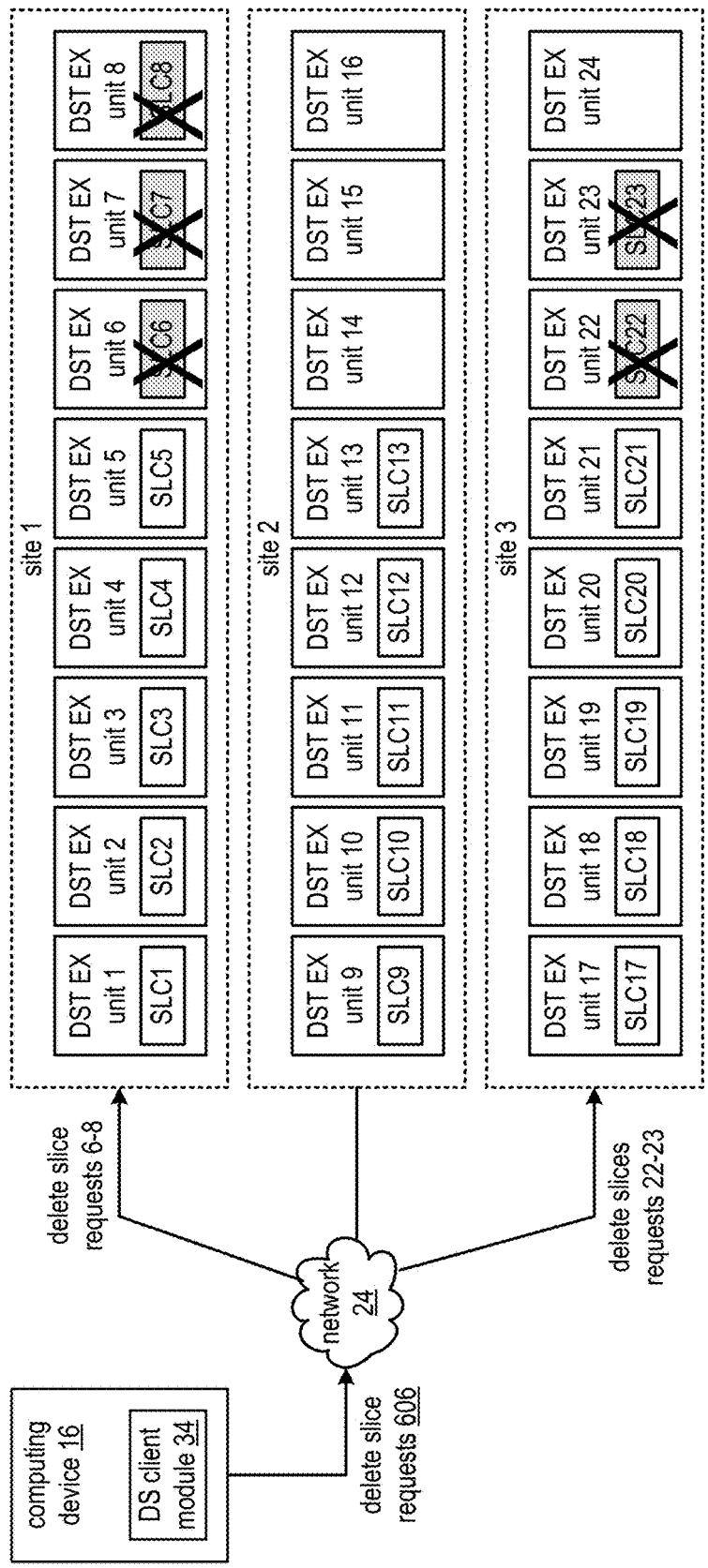
FIG. 9C is a schematic block diagram of an embodiment of a dispersed or distributed storage network (DSN) in accordance with the present invention.

FIGS. 9A, 9B, and 9C are schematic block diagrams of another embodiment of a dispersed storage network (DSN) that includes the computing device 16 of FIG. 1, the network 24 of FIG. 1, and a plurality of sites 1-3. The computing device 16 includes the DS client module 34 of FIG. 1. Each of the plurality of sites includes a set of DST execution (EX) units, where a total number of DST execution units is in accordance with an information dispersal algorithm (IDA) width of a dispersed storage error coding function. For example, the plurality of sites includes DST execution units 1-24 when the IDA width is 24. Each DST execution unit can be implemented utilizing the storage unit 36 of FIG. 1. The DSN functions to optimize data storage in the set of DST execution units.

To achieve maximal reliability and availability in consideration of sites outages and site destructions in a system, for example, when using a Trimmed Writes strategy, it can be necessary to equi-distribute slices among various sites. For example, in a 10-of-24 system with a Write Threshold equal to 15 across 3 sites, it can be desirable that no site contain more than 5 slices from any source, as if that site fails and there are only 15 extant slices, then the source will go below threshold and will be unrecoverable. However, when a source is written with one site offline, it can be necessary to write more than 5 slices to at least one of the remaining sites. Therefore, to recover maximum reliability following an unequally written write, it can be necessary to perform a rebuild. For example, if site 1 was down in the 10-of-24 system across 3 sites, assuming 8 ds units at each site, then it may be that 7 slices went to site 1, 8 slices went to site 2 and 0 slices went to site 3. When site 3 returns online, the rebuilder may perform a rebuild of the source and write the slices such that 5 slices are sent to site 1, 5 to site 3, and 5 to site 3, while the rest of the slices are "undone", such that there will be only 15 slices for that source. The particular storage units that are kept selected as recipients of the slices can be determined by a deterministic "affinity function", which takes a source name and a width and site count, and outputs an equi-distributed set of IDA pillars with a uniform probability distribution across all possible source names. This can equalize storage utilization, prevent imbalance, and/or maintains the number of slices at each site. The computing device, when writing the initial slices, can also write the write threshold slices to these preferred locations as indicated by the affinity function, and/or can undo the slices written to the locations not indicated by the affinity function's output for that source.

FIG. 9A illustrates steps of an example operation of the optimizing of the data storage where the DS client module 34 dispersed storage error encodes a data segment of the data to produce a set of encoded data slices 604, where at least a decode threshold number of encoded data slices are required for recovery of the data segment and where the set of encoded data slices 604 includes an IDA width number of encoded data slices. For example, the DS client module 34 dispersed storage error encodes the data segment to produce encoded data slices 1-24.

Having produced the set of encoded data slices 604, the DS client module 34 can obtain DSN configuration information. The obtaining includes at least one of receiving system registry information, receiving a query response, and performing a lookup. The DSN configuration information includes one or more of a number of sites of the plurality of sites and a number of DST execution units per site.

Having obtained the DSN configuration information, the DS client module 34 can map a write threshold number of encoded data slices of the set of encoded data slices to a write threshold number of DST execution units of the set of DST execution units in accordance with an affinity function to produce a slice storage mapping. For example, the DS client module 34 performs a deterministic function on one or more of an identifier associated with the data segment, the IDA width, and the number of sites to produce the slice storage mapping, where encoded data slices are to be stored in an equi-distributed set of DST execution units with a uniform probability distance function across all possible data segment identifiers. For instance, the DS client module 34 produces the slice storage mapping to include mapping encoded data slices 1-5 to DST execution units 1-5 of site 1, encoded data slices 9-13 to DST execution units 9-13 of site 2, and encoded data slices 17-21 to DST execution unit 17-21 of site 3 when the write threshold is 15 and a number of sites is 3 (e.g., evenly distributed).

Having produced the slice storage mapping, the DS client module 34 can facilitate storage of the write threshold number of encoded data slices to the write threshold number of DST execution units in accordance with the slice storage mapping. For example, DS client module 34 generates a write threshold number of write slice requests that includes the associated write threshold number of encoded data slices, sends, via the network 24, the write threshold number of write slice requests to corresponding DST execution units for storage (e.g., encoded data slices 1-5 to DST execution units 1-5, encoded data slices 9-13 to DST execution units 9-13, and encoded data slices 17-21 to DST execution units 17-21), identifies favorably stored encoded data slices (e.g., by interpreting write slice responses), issues one or more additional write slice requests when a number of favorably stored encoded data slices is less than the write threshold number, and/or deletes favorably stored encoded data slices when more than the write threshold number of encoded data slices have been stored (e.g., when issuing more than the write threshold number of write slice requests). Having successfully facilitated storage of the read threshold number of encoded data slices, the DS client module 34 can indicate that the write threshold number of encoded data slices have been successfully stored.

FIG. 9B illustrates further steps of the example of operation of the optimizing of the data storage where the DS client module 34 detects unavailability of one or more encoded data slices of the write threshold number of successfully stored encoded data slices. The detecting can include at least one of detecting a site failure, interpreting an error message, detecting a failure of one or more DST execution units, and/or detecting a storage error (e.g., a missing encoded data slice, a corrupted encoded data slice). For example, the DS client module 34 detects unavailability of encoded data slices 9-13 when interpreting an error message indicating that site 2 is temporarily unavailable.

Having detected the unavailability of the one or more encoded data slice, the DS client module 34 can obtain updated DSN configuration information. The obtaining of the updated DSN configuration information can include at least one of interpreting an updated test result, interpreting updated site availability information, interpreting updated DST execution unit availability information, interpreting updated system registry information, interpreting a further received query response, and/or performing a local lookup.

Having obtained the updated DSN configuration information, the DS client module 34 can map an updated write threshold number of encoded data slices of the set of encoded data slices to an updated write threshold number of available DST execution units in accordance with the affinity function and based on the updated DSN configuration information to produce an updated slice storage mapping. For example, the DS client module 34 produces the updated slice storage mapping to indicate storage of 8 encoded data slices at site 1 (e.g., encoded data slices 1-8), zero encoded data slices at site 2, and 7 encoded data slices at site 3 (e.g., encoded data slices 17-23; totaling 15 encoded data slices of the write threshold number distributed in a substantially equal fashion amongst available sites).

Having produced the updated slice storage mapping, the DS client module 34 can facilitate storage of the updated write threshold number of encoded data slices 604 to the write threshold number of available DST execution units in accordance with one or more of the updated slice storage mapping and the slice storage mapping (e.g., where already stored encoded data slices are located). The facilitating can include generating one or more additional encoded data slices for encoded data slices 604 of the updated slice storage mapping that are not included in the slice storage mapping and storing the additional encoded data slices in corresponding DST execution units of available sites. For example, the DS client module 34 retrieves a decode threshold number of encoded data slices of the set of encoded data slices (e.g., encoded data slices 1-5 from site 1, encoded data slices 17-21 from site 3) when the decode threshold is 10, dispersed storage error decodes the retrieved decode threshold number of encoded data slices to reproduce the data segment, dispersed storage error encodes the reproduced data segment to reproduce the set of encoded data slices, and/or sends, via the network 24, the one or more additional encoded data slices 604 to the corresponding DST execution units (e.g., encoded data slices 6-8 to DST execution units 6-8, encoded data slices 22-23 to DST execution units 22-23).

Alternatively or in addition, further received data for storage, when received while the site 2 is temporarily unavailable, can be stored in a similar fashion as described above. For example, the DS client module 34 encodes the further received data for storage to produce further sets of encoded data slices, selects a write threshold number of the further sets of encoded data slices, and/or facilitates storage of the selected read threshold number of further sets of encoded data slices 604 in the available sites 1 and 3.

FIG. 9C illustrates further steps of the example of operation of the optimizing of the data storage where the DS client module 34 detects availability of greater than the write threshold number of encoded data slices of the set of encoded data slices. The detecting can include one or more of detecting availability of a previously failed site, detecting availability of a previously temporarily unavailable site, interpreting an error message, detecting availability of one or more previously unavailable DST execution units, interpreting list slice responses, interpreting read slice responses, and/or detecting abatement of a storage error. For example, the DS client module 34 detects availability of encoded data slices 9-13 at site 2 when detecting that the previously temporarily unavailable site 2 is now available. As such, the DS client module 34 can detect that greater than the write threshold number of encoded data slices are available when detecting that encoded data slices 1-13 and 17-23 are available (e.g., 20 available encoded data slices is greater than a write threshold of 15).

Having detected the availability of the greater than the write threshold number of encoded data slices, the DS client module 34 can obtain further updated DSN configuration information. Having obtained the further updated DSN configuration information, the DS client module 34 can map a further updated write threshold number of encoded data slices of the set of encoded data slices to a further updated write threshold number of available DST execution units in accordance with the affinity function and based on the further updated DSN configuration information to produce a further updated slice storage mapping. For example, the processing system maps encoded data slices 1-5 to site 1, encoded data slices 9-13 to site 2, and encoded data slices 17-21 to site 3 to substantially even distribute the write threshold number of encoded data slices amongst the three sites.

Having produced the further updated slice storage mapping, the DS client module 34 cam facilitate storage of the further updated write threshold number of encoded data slices to the further updated write threshold number of available DST execution units in accordance with the further updated slice storage mapping. The facilitating can include one or more of deleting one or more encoded data slices when the number of available encoded data slices is greater than the read threshold number and/or rebuilding one or more encoded data slices for storage in the one or more DST execution units of the set of DST execution units in accordance with the further updated slice mapping. For example, the DS client module 34 issues delete slice requests 606 for encoded data slices 6-8 to DST execution units 6-8 and for encoded data slices 22-23 to DST execution units 22-23. As a result, storage of the write threshold number of encoded data slices is maintained in a uniformly distributed fashion. Alternatively, the DS client module 34 can rebuild encoded data slices 9-13 when the encoded data slices 9-13 are unavailable as the previously temporarily unavailable site 2 becomes available.

In various embodiments, a processing system of a computing device includes at least one processor and a memory that stores operational instructions, that when executed by the at least one processor cause the processing system to dispersed storage error encode a data segment to produce a set of encoded data slices. DSN configuration information is obtained and a write threshold number of encoded data slices is mapped to a write threshold number of storage units to produce a slice storage mapping. Storage of the write threshold number of encoded data slices to the write threshold number of storage units is facilitated in accordance with the slice storage mapping.

Unavailability of at least one of the write threshold number of encoded data slices is detected, and first updated DSN configuration information is obtained. A first updated write threshold number of encoded data slices is mapped to a first updated write threshold number of storage units to produce a first updated slice storage mapping. Storage of the first updated write threshold number of encoded data slices to the first updated write threshold number of storage units is facilitated in accordance with the first updated slice storage mapping.

Availability of greater than the write threshold number of encoded data slices is detected and second updated DSN configuration information is obtained. A second updated write threshold number of encoded data slices is mapped to a second updated write threshold number of storage units to produce a second updated slice storage mapping. Storage of the second updated write threshold number of encoded data slices to the second updated write threshold number of storage units is facilitated in accordance with the second updated slice storage mapping.

In various embodiments, obtaining the DSN configuration information includes interpreting a query response. In various embodiments, a deterministic function is performed on an identifier associated with the data segment, an IDA width number, and a number of available sites to produce the slice storage mapping. In various embodiments, the deterministic function is performed to produce the first updated slice storage mapping and/or the second updated slice storage mapping, based on currently available encoded data slices of the write threshold number of encoded data slices. In various embodiments, producing the first updated slice storage mapping and/or the second updated slice storage mapping is performed without regards to currently available encoded data slices.

In various embodiments, facilitating storage of the write threshold number of encoded data slices includes issuing a plurality of write slice requests to a set of storage units that includes the write threshold number of storage units. At least one encoded data slice beyond the write threshold number of encoded data slices is from the set of encoded data slices. Storage of the write threshold number of encoded data slices is retried in response to determining that the write threshold number of encoded data slices have not yet been successfully stored.

In various embodiments, detecting the unavailability of the at least one of the write threshold number of encoded data slices includes detecting a storage unit failure responsible for storing the at least one of the write threshold number of encoded data slices. In various embodiments, facilitating storage of the first updated write threshold number of encoded data slices includes identifying a subset of encoded data slices of the first updated write threshold number of encoded data slices that have not been stored. The subset of encoded data slices is rebuilt and the rebuilt subset of encoded data slices is sent to a corresponding subset of storage units of a set of storage units for storage.

In various embodiments, detecting the availability of greater than the write threshold number of encoded data slices includes detecting availability of a previously unavailable storage unit that is responsible for storage of at least one of the greater than the write threshold number of encoded data slices. In various embodiments, facilitating storage of the second updated write threshold number of encoded data slices includes deleting a first at least one previously stored encoded data slices of the set of encoded data slices that is not included in the second updated slice storage mapping. A second at least one encoded data slice that is included in the second updated slice storage mapping is determined to be unavailable. The second at least one encoded data slice is rebuilt.

Figure 10:
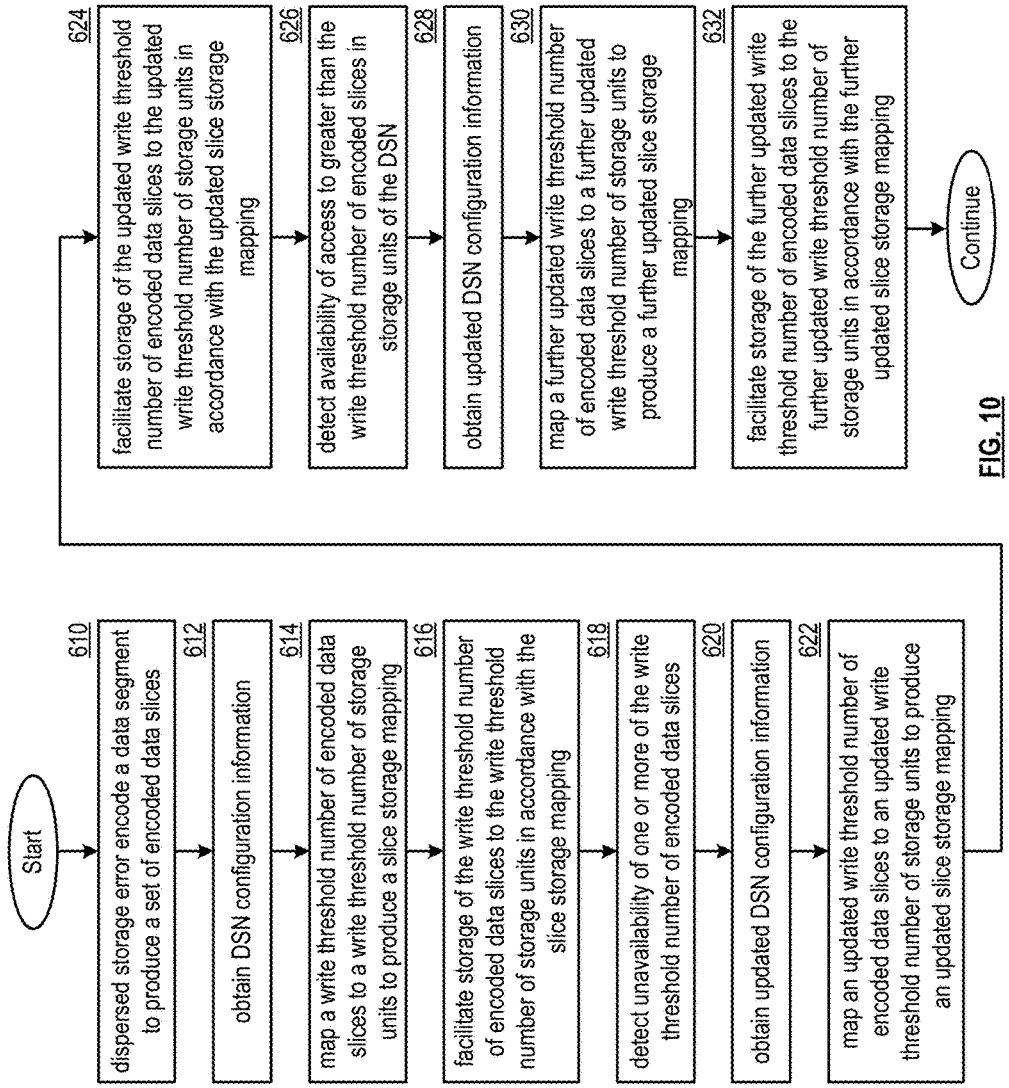
FIG. 10 is a logic diagram of an example of a method of optimizing data storage in accordance with the present invention.

FIG. 10 is a flowchart illustrating an example of optimizing data storage. In particular, a method is presented for use in association with one or more functions and features described in conjunction with FIGS. 1-9C, for execution by a computing device that includes a processor or via another processing system of a dispersed storage network that includes at least one processor and memory that stores instruction that configure the processor or processors to perform the steps described below.

The method includes step 610 where a processing system (e.g., of a distributed storage and task (DS) client module and/or of a computing device) dispersed storage error encodes a data segment to produce a set of encoded data slices. The method continues at step 612 where the processing system obtains DSN configuration information. For example, the processing system interprets a query response. The method continues at step 614 where the processing system maps a write threshold number of encoded data slices to a write threshold number of storage units to produce a slice storage mapping. For example, the processing system performs a deterministic function on an identifier associated with the data segment, an IDA width number, and/or a number of available sites to produce the slice storage mapping.

The method continues at step 616 where the processing system facilitates storage of the write threshold number of encoded data slices to the write threshold number of storage units in accordance with the slice storage mapping. For example, the processing system issues write slice requests to storage units of a set of storage units that includes the write threshold number of storage units, trims (e.g., deletes) encoded data slices beyond the write threshold number, and/or retries storage of encoded data slices when determining that the write threshold number has not yet been successfully stored.

The method continues at step 618 where the processing system detects unavailability of one or more of the write threshold number of encoded data slices. The detecting can include at least one of detecting a site failure, detecting a storage unit failure, and/or interpreting a slice storage error. The method continues at step 620 where the processing system obtains updated DSN configuration information. For example, the processing system can interpret a subsequent query response.

The method continues at step 622 where the processing system maps an updated write threshold number of encoded data slices to an updated write threshold number of storage units to produce an updated slice storage mapping. For example, the processing system performs the deterministic function based on currently available encoded data slices of the write threshold number of encoded data slices to produce the updated slice storage mapping. Alternatively, the processing system can produce a new mapping without regards to previously stored encoded data slices.

The method continues at step 624 where the processing system facilitates storage of the updated write threshold number of encoded data slices to the updated write threshold number of storage units in accordance with the updated slice storage mapping. For example, the processing system identifies encoded data slices of the updated write threshold number of encoded data slices that have not been stored, rebuilds the identified encoded data slices, and/or sends the rebuilt encoded data slices to corresponding storage units for storage.

The method continues at step 626 where the processing system detects availability of greater than the write threshold number of encoded data slices. The detecting can include at least one of detecting availability of a previously filled site, detecting availability of a previously filled storage unit, detecting availability of a previously unavailable site, detecting availability of a previously unavailable storage unit, and/or detecting availability of a previously unavailable encoded data slice.

The method continues at step 628 where the processing system obtains updated DSN configuration information. For example, the processing system interprets a still further query response. The method continues at step 630 where the processing system maps a further updated write threshold number of encoded data slices to a further updated write threshold number of storage units to produce a further updated slice storage mapping. For example, the processing system performs the deterministic function further based on currently available encoded data slices of the write threshold number of encoded data slices to produce the further updated slice storage mapping. Alternatively, the processing system can produce a new slice storage mapping without regards to previously stored and available encoded data slices.

The method continues at step 632 where the processing system facilitates storage of the further updated write threshold number of encoded data slices to the further updated write threshold number of storage units in accordance with the further updated slice storage mapping. The facilitating can include one or more of deleting previously stored encoded data slices that are not included in the further updated slice storage mapping and/or rebuilding encoded data slices for encoded data slices that are included in the further updated slice storage mapping but are not available.

In various embodiments, a non-transitory computer readable storage medium includes at least one memory section that stores operational instructions that, when executed by a processing system of a dispersed storage network (DSN) that includes a processor and a memory, causes the processing system to dispersed storage error encode a data segment to produce a set of encoded data slices. DSN configuration information is obtained and a write threshold number of encoded data slices is mapped to a write threshold number of storage units to produce a slice storage mapping. Storage of the write threshold number of encoded data slices to the write threshold number of storage units is facilitated in accordance with the slice storage mapping.

Unavailability of at least one of the write threshold number of encoded data slices is detected, and first updated DSN configuration information is obtained. A first updated write threshold number of encoded data slices is mapped to a first updated write threshold number of storage units to produce a first updated slice storage mapping. Storage of the first updated write threshold number of encoded data slices to the first updated write threshold number of storage units is facilitated in accordance with the first updated slice storage mapping.

Availability of greater than the write threshold number of encoded data slices is detected and second updated DSN configuration information is obtained. A second updated write threshold number of encoded data slices is mapped to a second updated write threshold number of storage units to produce a second updated slice storage mapping. Storage of the second updated write threshold number of encoded data slices to the second updated write threshold number of storage units is facilitated in accordance with the second updated slice storage mapping.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing system", "processing module", "processing circuit", "processor", and/or "processing unit" may be used interchangeably, and may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing system, processing module, module, processing circuit, and/or processing unit may be, or further include, memory and/or an integrated memory element, which may be a single memory device, a plurality of memory devices, and/or embedded circuitry of another processing system, processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing system, processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing system, processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing system, processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a computing device that includes a processor, the method comprises:
dispersed storage error encoding, by the computing device, a data segment to produce a set of encoded data slices;
obtaining, by the computing device, dispersed storage network (DSN) configuration information by receiving system registry information, wherein the DSN configuration information indicates a plurality of storage units;
mapping, by the computing device, a write threshold number of encoded data slices to a write threshold number of storage units of the plurality of storage units, based on the DSN configuration information, to produce a slice storage mapping;
facilitating, by the computing device, storage of the write threshold number of encoded data slices to the write threshold number of storage units in accordance with the slice storage mapping;
detecting, by the computing device, unavailability of at least one of the write threshold number of encoded data slices by interpreting an error message indicating the at least one of the write threshold number of encoded data slices is unavailable;
obtaining, by the computing device, first updated DSN configuration information by receiving updated system registry information, wherein the first updated DSN configuration information indicates at least one of the plurality of storage units is unavailable;

mapping, by the computing device, a first updated write threshold number of encoded data slices to a first updated write threshold number of storage units to produce a first updated slice storage mapping based on the first updated DSN configuration information;

facilitating, by the computing device, storage of the first updated write threshold number of encoded data slices to the first updated write threshold number of storage units in accordance with the first updated slice storage mapping;

obtaining, by the computing device, second updated DSN configuration information by receiving second updated system registry information, wherein the second updated DSN configuration information indicates a change in availability of at least one of the plurality of storage units indicated as unavailable in the first updated DSN configuration information;

mapping, by the computing device, a second updated write threshold number of encoded data slices to a second updated write threshold number of storage units to produce a second updated slice storage mapping, based on the second updated DSN configuration information, wherein the second updated write threshold number of encoded data slices is determined by altering the first updated write threshold number of encoded data slices based on the second updated DSN configuration information; and facilitating, by the computing device, storage of the second updated write threshold number of encoded data slices to the second updated write threshold number of storage units in accordance with the second updated slice storage mapping.

2. The method of claim 1, wherein obtaining the DSN configuration information includes interpreting a query response.

3. The method of claim 1, further comprising:
performing a deterministic function on an identifier associated with the data segment, an IDA width number, and a number of available sites to produce the slice storage mapping.

4. The method of claim 3, wherein the deterministic function is performed to produce at least one of: the first updated slice storage mapping or the second updated slice storage mapping, based on currently available encoded data slices of the write threshold number of encoded data slices.

5. The method of claim 1, wherein producing at least one of: the first updated slice storage mapping or the second updated slice storage mapping is performed without regards to currently available encoded data slices.

6. The method of claim 1, wherein facilitating storage of the write threshold number of encoded data slices includes:
issuing a plurality of write slice requests to a set of storage units that includes the write threshold number of storage units; and
removing at least one encoded data slice beyond the write threshold number of encoded data slices from the set of encoded data slices; and
retrying storage of the write threshold number of encoded data slices in response to determining that the write threshold number of encoded data slices have not yet been successfully stored.

7. The method of claim 1, wherein detecting the unavailability of the at least one of the write threshold number of encoded data slices includes detecting a storage unit failure responsible for storing the at least one of the write threshold number of encoded data slices.

8. The method of claim 1, wherein facilitating storage of the first updated write threshold number of encoded data slices includes:
identifying a subset of encoded data slices of the first updated write threshold number of encoded data slices that have not been stored;
rebuilding the subset of encoded data slices; and
sending the rebuilt subset of encoded data slices to a corresponding subset of storage units of a set of storage units for storage.

9. The method of claim 1, further comprising:
detecting availability of a previously unavailable storage unit that is responsible for storage of a previously unavailable one of the set of encoded data slices.

10. The method of claim 1, wherein facilitating storage of the second updated write threshold number of encoded data slices includes:
deleting a first at least one previously stored encoded data slices of the set of encoded data slices that is not included in the second updated slice storage mapping; and
determining a second at least one encoded data slice that is included in the second updated slice storage mapping is not available; and
rebuilding the second at least one encoded data slice.

11. A processing system of a computing device comprises:
at least one processor;
a memory that stores operational instructions, that when executed by the at least one processor cause the processing system to:
dispersed storage error encode a data segment to produce a set of encoded data slices;
obtain dispersed storage network (DSN) configuration information by receiving system registry information, wherein the DSN configuration information indicates a plurality of storage units;
map a write threshold number of encoded data slices to a write threshold number of storage units of the plurality of storage units, based on the DSN configuration information, to produce a slice storage mapping;
facilitate storage of the write threshold number of encoded data slices to the write threshold number of storage units in accordance with the slice storage mapping;
detect unavailability of at least one of the write threshold number of encoded data slices by interpreting an error message indicating the at least one of the write threshold number of encoded data slices is unavailable;
obtain first updated DSN configuration information by receiving updated system registry information, wherein the first updated DSN configuration information indicates at least one of the plurality of storage units is unavailable;
map a first updated write threshold number of encoded data slices to a first updated write threshold number of storage units to produce a first updated slice storage mapping based on the first updated DSN configuration information;
facilitate storage of the first updated write threshold number of encoded data slices to the first updated write threshold number of storage units in accordance with the first updated slice storage mapping;

obtain second updated DSN configuration information by receiving second updated system registry information, wherein the second updated DSN configuration information indicates a change in availability of at least one of the plurality of storage units indicated as unavailable in the first updated DSN configuration information;

map a second updated write threshold number of encoded data slices to a second updated write threshold number of storage units to produce a second updated slice storage mapping based on the second updated DSN configuration information, wherein the second updated write threshold number of encoded data slices is determined by altering the first updated write threshold number of encoded data slices based on the second updated DSN configuration information; and facilitate storage of the second updated write threshold number of encoded data slices to the second updated write threshold number of storage units in accordance with the second updated slice storage mapping.

12. The processing system of claim 11, wherein obtaining the DSN configuration information includes interpreting a query response.

13. The processing system of claim 11, wherein the operational instructions, when executed by the at least one processor, further cause the processing system to:
perform a deterministic function on an identifier associated with the data segment, an IDA width number, and a number of available sites to produce the slice storage mapping.

14. The processing system of claim 13, wherein the deterministic function is performed to produce at least one of: the first updated slice storage mapping or the second updated slice storage mapping, based on currently available encoded data slices of the write threshold number of encoded data slices.

15. The processing system of claim 11, wherein facilitating storage of the write threshold number of encoded data slices includes:
issuing a plurality of write slice requests to a set of storage units that includes the write threshold number of storage units; and
removing at least one encoded data slice beyond the write threshold number of encoded data slices from the set of encoded data slices; and
retrying storage of the write threshold number of encoded data slices in response to determining that the write threshold number of encoded data slices have not yet been successfully stored.

16. The processing system of claim 11, wherein detecting the unavailability of the at least one of the write threshold number of encoded data slices includes detecting a storage unit failure responsible for storing the at least one of the write threshold number of encoded data slices.

17. The processing system of claim 11, wherein facilitating storage of the first updated write threshold number of encoded data slices includes:
identifying a subset of encoded data slices of the first updated write threshold number of encoded data slices that have not been stored;
rebuilding the subset of encoded data slices; and
sending the rebuilt subset of encoded data slices to a corresponding subset of storage units of a set of storage units for storage.

18. The processing system of claim 11, wherein the operational instructions, when executed by the at least one processor, further cause the processing system to:
detect availability of a previously unavailable storage unit that is responsible for storage of a previously unavailable one of the set of encoded data slices.

19. The processing system of claim 11, wherein facilitating storage of the second updated write threshold number of encoded data slices includes:
deleting a first at least one previously stored encoded data slices of the set of encoded data slices that is not included in the second updated slice storage mapping; and
determining a second at least one encoded data slice that is included in the second updated slice storage mapping is not available; and
rebuilding the second at least one encoded data slice.

20. A non-transitory computer readable storage medium comprises:
at least one memory section that stores operational instructions that, when executed by a processing system of a dispersed storage network (DSN) that includes a processor and a memory, causes the processing system to:
dispersed storage error encode a data segment to produce a set of encoded data slices;
obtain dispersed storage network (DSN) configuration information by receiving system registry information, wherein the DSN configuration information indicates a plurality of storage units;
map a write threshold number of encoded data slices to a write threshold number of storage units of the plurality of storage units, based on the DSN configuration information, to produce a slice storage mapping;
facilitate storage of the write threshold number of encoded data slices to the write threshold number of storage units in accordance with the slice storage mapping;
detect unavailability of at least one of the write threshold number of encoded data slices by interpreting an error message indicating the at least one of the write threshold number of encoded data slices is unavailable;
obtain first updated DSN configuration information by receiving updated system registry information, wherein the first updated DSN configuration information indicates at least one of the plurality of storage units is unavailable;
map a first updated write threshold number of encoded data slices to a first updated write threshold number of storage units to produce a first updated slice storage mapping based on the first updated DSN configuration information;
facilitate storage of the first updated write threshold number of encoded data slices to the first updated write threshold number of storage units in accordance with the first updated slice storage mapping;
obtain second updated DSN configuration information by receiving second updated system registry information, wherein the second updated DSN configuration information indicates a change in availability of at least one of the plurality of storage units indicated as unavailable in the first updated DSN configuration information;
map a second updated write threshold number of encoded data slices to a second updated write threshold number of storage units to produce a second updated slice storage mapping based on the second updated DSN configuration information, wherein the second updated write threshold number of encoded data slices is determined by altering the first updated write threshold number of encoded data slices based on the second updated DSN configuration information; and facilitate storage of the second updated write threshold number of encoded data slices to the second updated write threshold number of storage units in accordance with the second updated slice storage mapping.

\* \* \* \* \*